United States Patent [19]

van de Eerden et al.

[11] Patent Number: 5,152,715
[45] Date of Patent: Oct. 6, 1992

[54] METHOD AND DEVICE FOR SEPARATING HEART, LUNGS AND LIVER FROM THE VISCERA OF A BIRD

[75] Inventors: Henricus F. J. M. van de Eerden; Adrianus J. van den Nieuwelaar, both of Gemert, Netherlands

[73] Assignee: Stork PMT B.V., Boxmeer, Netherlands

[21] Appl. No.: 776,815

[22] Filed: Oct. 15, 1991

[30] Foreign Application Priority Data

Oct. 19, 1990 [NL] Netherlands ............ 9002287

[51] Int. Cl.$^5$ ............................................ A22C 11/00
[52] U.S. Cl. ..................... 452/106; 452/111; 452/120
[58] Field of Search ............... 452/106, 111, 112, 123, 452/109

[56] References Cited

U.S. PATENT DOCUMENTS

| | | | |
|---|---|---|---|
| 4,951,352 | 8/1990 | Harben, III et al. | 452/106 |
| 4,965,908 | 10/1990 | Meyn | 452/106 |
| 5,026,317 | 6/1991 | Kennedy | 452/106 |
| 5,041,052 | 8/1991 | Conner et al. | 425/106 |
| 5,041,053 | 8/1991 | Ellis et al. | 452/106 |

FOREIGN PATENT DOCUMENTS

| | | |
|---|---|---|
| 813138 | 7/1974 | Belgium . |
| 141432 | 5/1985 | European Pat. Off. . |
| 1415153 | 11/1975 | United Kingdom . |
| 2004175 | 3/1979 | United Kingdom . |

*Primary Examiner*—Willis Little
*Attorney, Agent, or Firm*—Hurt, Richardson, Garner, Todd & Cadenhead

[57] ABSTRACT

In a separating device, the heart, lungs and liver are separated from the viscera of a slaughtered bird by conveying these organs, including the gall-bladder, connected to the bird, essentially parallel to the path of the bird with a helical roller. First the heart and lungs are separated from the liver by cutting through the tissue connecting the heart and lungs, and the liver. Next, the liver is separated from the remainder of the viscera by increasing the distance between the liver and the gall-bladder, and cutting through the tissue connecting the liver and the gall-bladder.

6 Claims, 5 Drawing Sheets

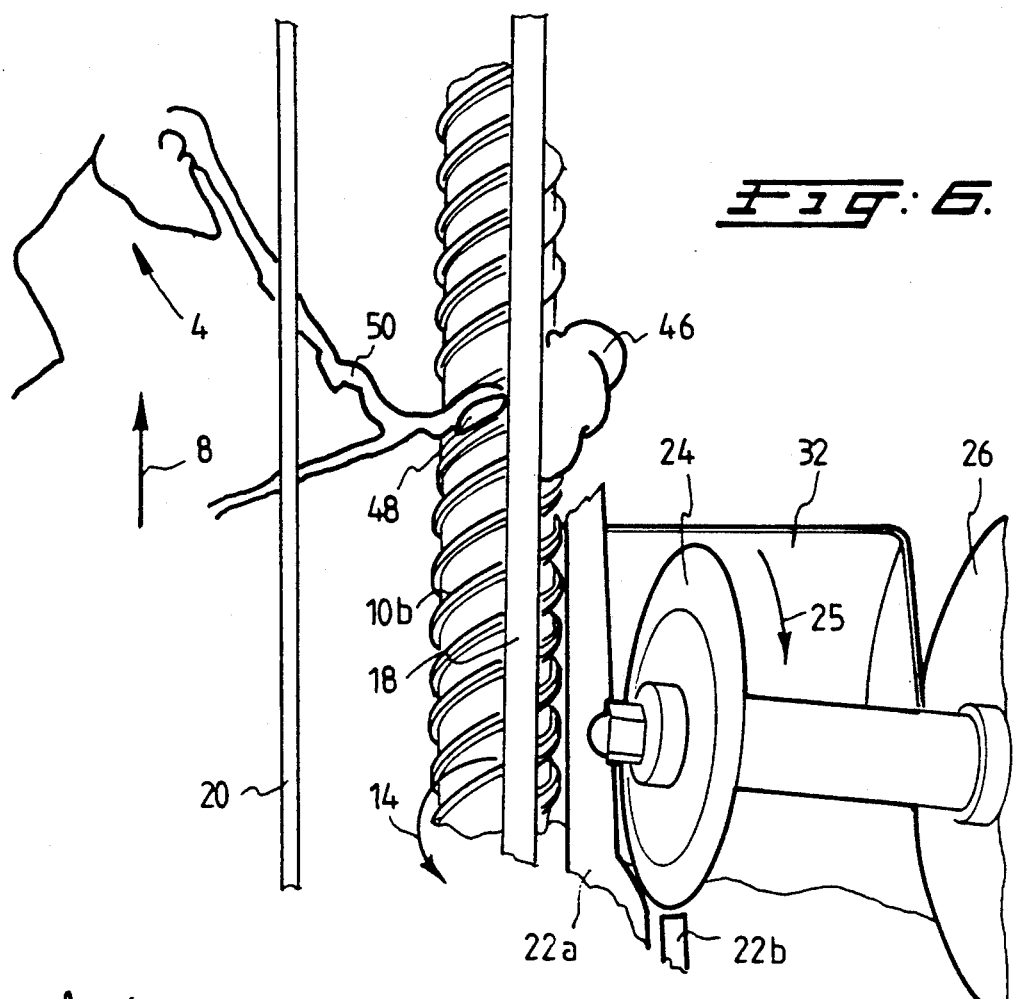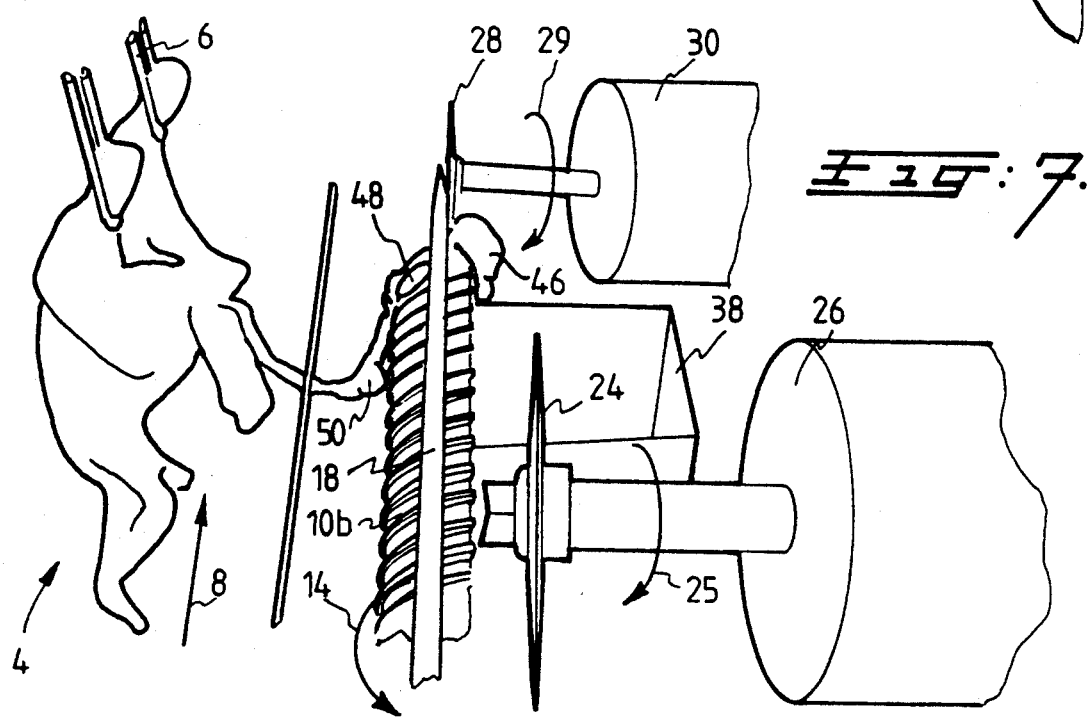

METHOD AND DEVICE FOR SEPARATING HEART, LUNGS AND LIVER FROM THE VISCERA OF A BIRD

BACKGROUND OF THE INVENTION

This invention relates to a method for separating the heart, lungs and the liver from the viscera of a slaughtered bird, comprising the steps of : positioning and moving along a part of the viscera connected to the bird, which part comprises the heart, the lungs, the liver and the gall-bladder; guiding of the connecting tissue between the liver, on the one hand, and the heart and the lungs, on the other, past heart/lung separating means which separate the heart and the lungs from the liver and the remainder of the advanced viscera; and guiding of the liver past liver separating means which separate the liver from the remainder of the advanced viscera. The invention also relates to a device designed for carrying out this method, comprising:a conveyor for moving the bird along a predetermined path; viscera conveyance means for moving a part of the viscera comprising the heart, the lungs, the liver and the gall-bladder connected to the bird along essentially parallel to the path of the bird; heart/lung guiding means for positioning the connection between the liver, on the one hand and the heart and the lungs, on the other, relative to heart/lung separating means for breaking the connection between the liver, on the one hand, and the heart and the lungs, on the other; and liver guiding means for positioning the liver relative to liver separating means for breaking the connection between the liver and the remainder of the viscera.

DISCUSSION OF THE PRIOR ART

A method and a device for separating the heart, lungs and liver from the viscera of a slaughtered bird are known from U.S. Patent Specification No. 4,951,352. In the known device a part of the viscera, which part comprises the heart, the lungs, the liver and the gall-bladder and is connected to the carcass of a slaughtered bird moved along by a conveyor, is moved along by means of a second conveyor mainly parallel to the path of the conveyor. In the course of this, heart/lung guiding means and separating means ensure that in a first stage of the operation carried out by the device the connecting tissue between the liver, on the one hand, and the heart and the lungs, on the other, is severed, while a pulling force is exerted on said tissue in order to position the heart and the lungs by taking the path of the carcass a greater distance away from the heart/lung guiding means, by which measure the viscera situated between the carcass, on the one hand, and the heart and the lungs, on the other, supply the required pulling force. In a subsequent operating stage the liver is moved past liver guiding means to liver separating means, for which again the pulling force in the viscera connecting the liver and the carcass is needed.

Good functioning of the known device, and therefore the carrying out of the known method, thus depends on the existence of said pulling force, which, however, can be produced only if the viscera connecting the carcass and the liver or the heart and the lungs to each other are strong enough and sufficiently firmly connected to the carcass and the liver or the heart and the lungs. A good connection to the carcass cannot, however, be guaranteed, since the connecting viscera consist largely of a part of the intestinal tract of which further parts can be pulled from the carcass with relatively little force. It is also necessary for proper functioning of the device that the conveyor for moving along the carcass runs in synchronism with the second conveyor for moving along a part of the viscera, in order to prevent a breakage in the connecting viscera. This means that a reliable functioning of the device is far from certain and there is a great risk that, as a result of the virtual disappearance of the pulling force in the connecting viscera, during the separation of heart and lungs the liver will be cut through, and during the separation of the liver the gall-bladder adjacent to the liver will be cut through, instead of the tissues connecting said organs to each other being cut through. These wrong cuts make it necessary to carry out an expensive repair operation by hand if a part of the liver is still connected to heart and lungs, and greatly reduce the value of a liver thus obtained, part of which is cut off or contaminated with bile.

SUMMARY OF THE INVENTION

It is now the first object of the invention to be able to separate the heart, lungs and liver from the viscera of a bird with no negative effects of breakage of the connecting viscera or disappearance of a pulling force therein.

A further object of the invention is to provide a method and device by which heart, lungs and liver can be separated undamaged from the viscera of a bird, i.e. especially without cutting unintentionally through the liver or the gall-bladder.

These objects are attained according to the invention by increasing the distance between the liver and the gall-bladder during guidance of the liver in such a way that the liver separating means act only on the tissue connecting the liver and the gall-bladder.

In a device for carrying out the method according to the invention the viscera conveyance means can cooperate with the liver guiding means for positioning the liver and the gall-bladder in such a way relative to the liver separating means that the distance between the liver and the gall-bladder is increased and the liver separating means act solely on the tissue connecting the liver and the gall-bladder.

The claims and advantages will be more readily appreciated as the same becomes better understood by reference to the following detailed description and considered in connection with the accompanying drawings in which like reference symbols designate like parts.

DESCRIPTION OF THE DRAWINGS

FIGS. 2-7 show in perspective partial side and top views of respective successive processing stages for separating the heart, the lungs and the liver from the viscera by means of the device according to FIG. 1 shown in greater detail in these figures.

DESCRIPTION OF THE PREFERRED EMBODIMENT

Figure 1:
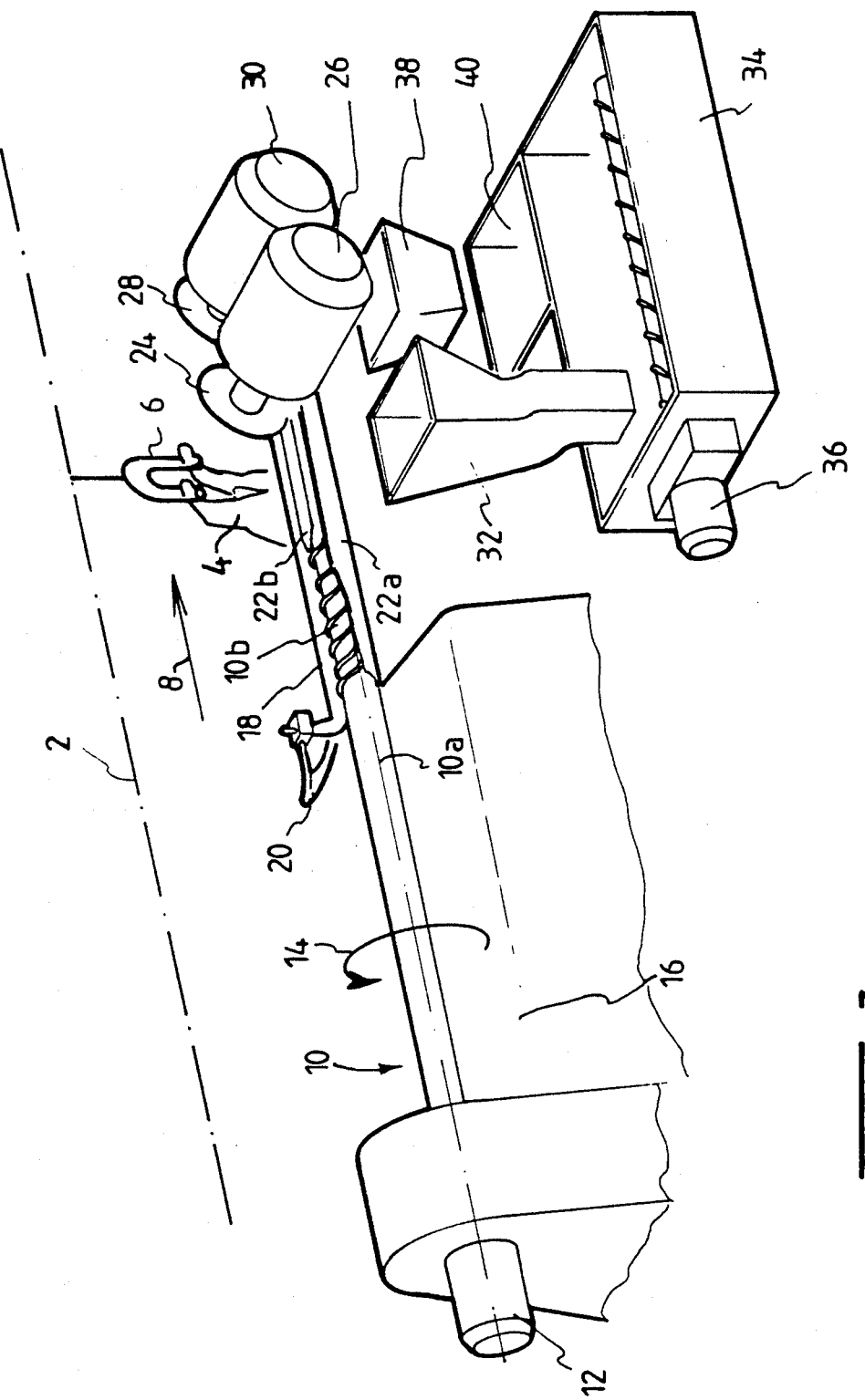
FIG. 1 shows a perspective view of a preferred embodiment of the device according to the invention.

FIG. 1 shows a schematically illustrated conveyor 2 on which slaughtered birds 4 hanging by the legs on hooks 6 are conveyed in the direction of arrow 8. Such conveyors are generally known and will not be shown in any further detail here. The bird 4, whose viscera have already been removed from the belly cavity and inspected by a veterinary inspector, is moved along in the conveyor 2 parallel to the lengthwise direction of a viscera conveyor element 10. The viscera conveyor element 10 comprises a cylindrical part 10a and a part provided with a helical rib which will be indicated below as helical roller 10b. The viscera conveyor element 10 is driven by means of a motor 12 in such a way that it rotates in the direction of arrow 14. A wall 16 is disposed parallel to and extending along the cylindrical part 10a of viscera conveyor element 10, fitting to the surface thereof. Fitted above the helical roller 10b and parallel thereto is a liver guide 18, a narrow gap being present between the radial outside of the helical rib of the helical roller 10b and the bottom edge of the liver guide 18. Fitted lower than the axis of the helical roller, at the side of the conveyor next to the helical roller 10b and parallel thereto is a viscera guide 20, of which only one bent end is shown in FIG. 1. Further, a bottom heart/lung guide 22a and a top heart lung guide 22b are provided parallel to the helical roller 10b. Disposed between the heart/lung guides 22a and 22b and the helical roller 10b is a rotary cutter 24 which is driven by a motor 26. Disposed some distance therefrom, at the end of liver guide 18 above the helical roller 10b is a second rotary cutter 28 which is driven by a motor 30. A funnel 32, leading to a heart/lung separator 34, is disposed below the cutter 24 which is designed for separating the heart and the lungs from the viscera. The heart/lung separator 34 comprises two helical rollers which are driven by a motor 36, and the functioning of which will be described in greater detail below with reference to FIG. 8. A funnel 38 is disposed below the cutter 28 for collection of the livers cut off by said cutter from the viscera, said livers passing via the funnel 38 into a liver collection bin 40.

For the sake of clarity, only the structural elements necessary for the separating operations and their mutual positioning are shown in the figures; parts which are of little relevance to the invention, such as a frame, supports for the guides and cover plates for increasing the safety of the operator, are not shown.

Figure 2:
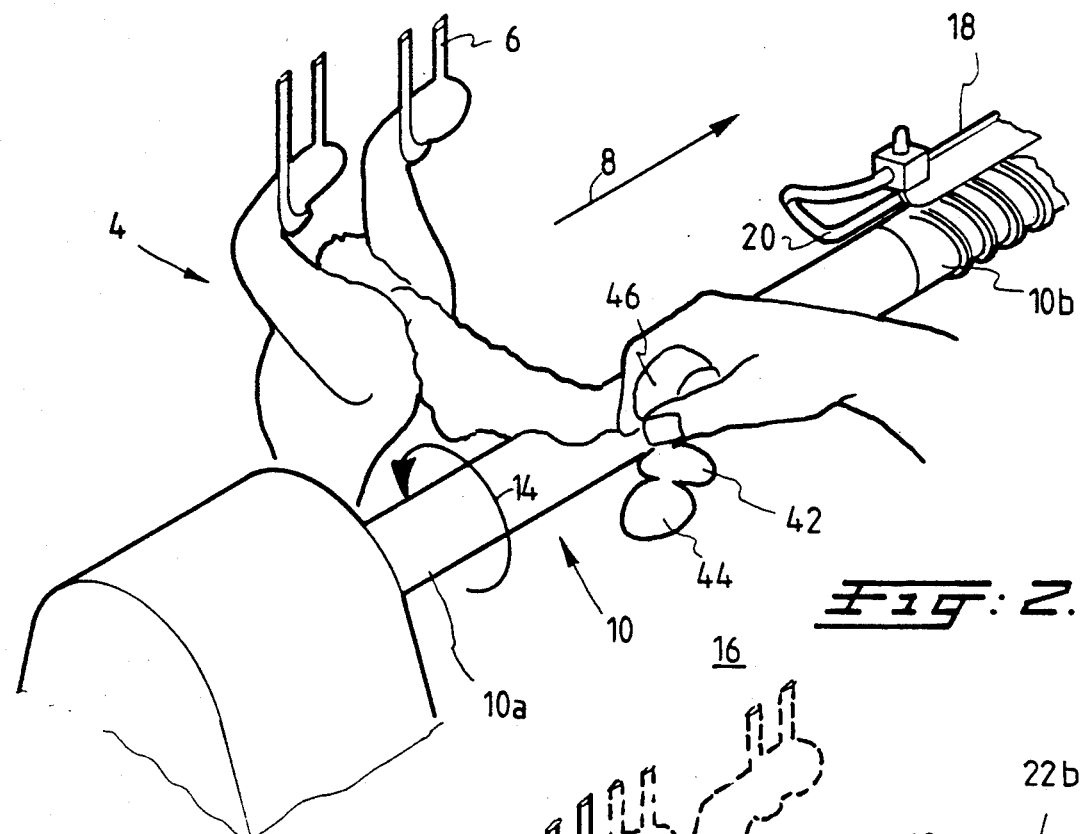
Figure 3:
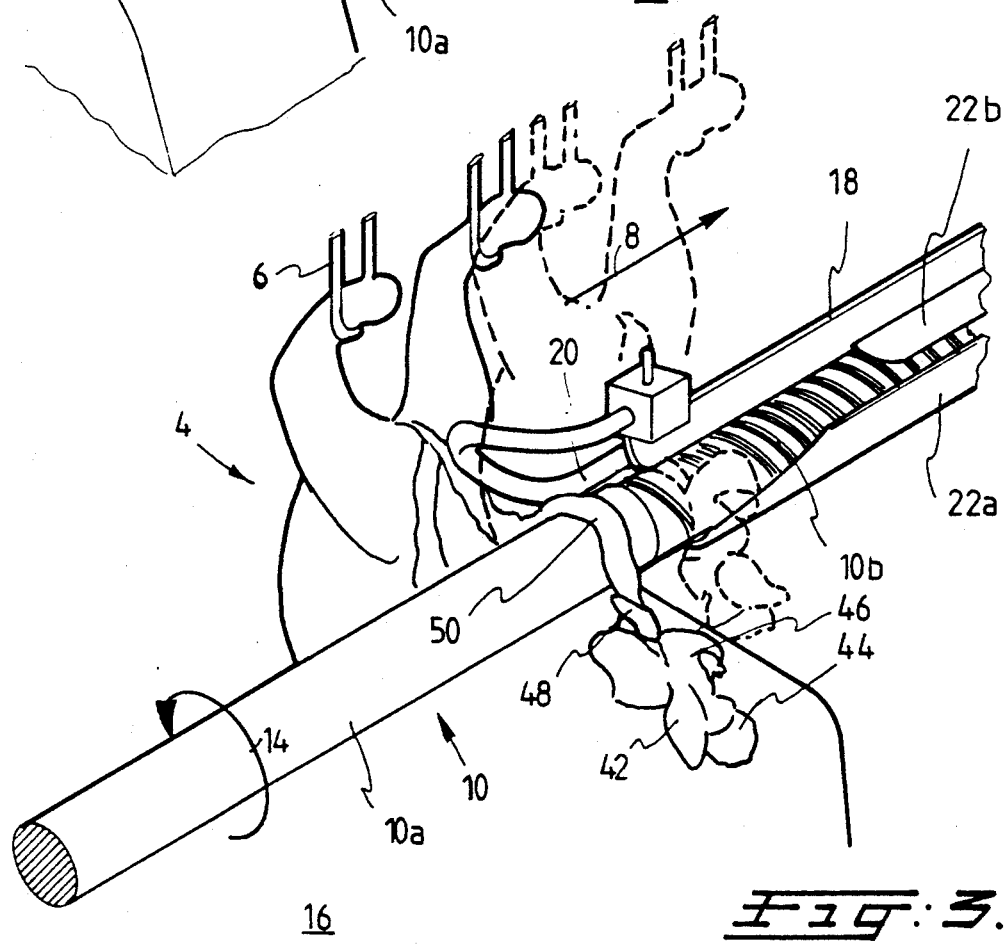

FIG. 2 shows a first processing of the viscera of the bird 4. The part of the viscera containing the heart 42, the lungs 44, the liver 46 and the gall-bladder (not shown in FIG. 2) connected to the liver is positioned by hand on the wall 16 over the viscera conveyor element 10 rotating in the direction of the arrow 14. By the advancement of the bird 4 on the hook 6 in the direction of the arrow 8, the organs connected to each other and to the remainder of the viscera of the bird are carried along on the wall 16 also in the direction of the arrow 8. This is illustrated in FIG. 3, in which the gall-bladder 42-48 is also shown. The conveyance of the organs 42-48 over the surface 16 is facilitated by making this surface smooth and by the friction-reducing rotation of the smooth cylindrical part 10a of the viscera conveyor element 10 in the direction of the arrow 14. The viscera tissue 50 connecting the bird 4 to the organs 42-48, through the conveyance in the direction of the arrow 8, reaches the gap between the liver guide 18 and the helical roller 10b and is subject there to a force in the direction of the arrow 14, said force being exerted by the helical rib of the helical roller 10b, and to a force which is also exerted by the helical roller 10b in the direction of the arrow 14. The latter force results in the organs 42-48 being moved in the direction of the liver guide 18 by the pulling force thus produced in the viscera connection 50. This movement is symbolised in FIG. 3 by the indication of the organs 42-48 by means of dashed lines closer to the liver guide 18. The movement of the bird 4 is also indicated by dashed lines. It is now of minor importance whether the carcass of the bird 4 moves in synchronism with the organs 42-48 or not, since a pulling force in the viscera connection 50 does not play any part at all towards good functioning of the device when the heart, the lungs and the liver are being separated.

Figure 4:
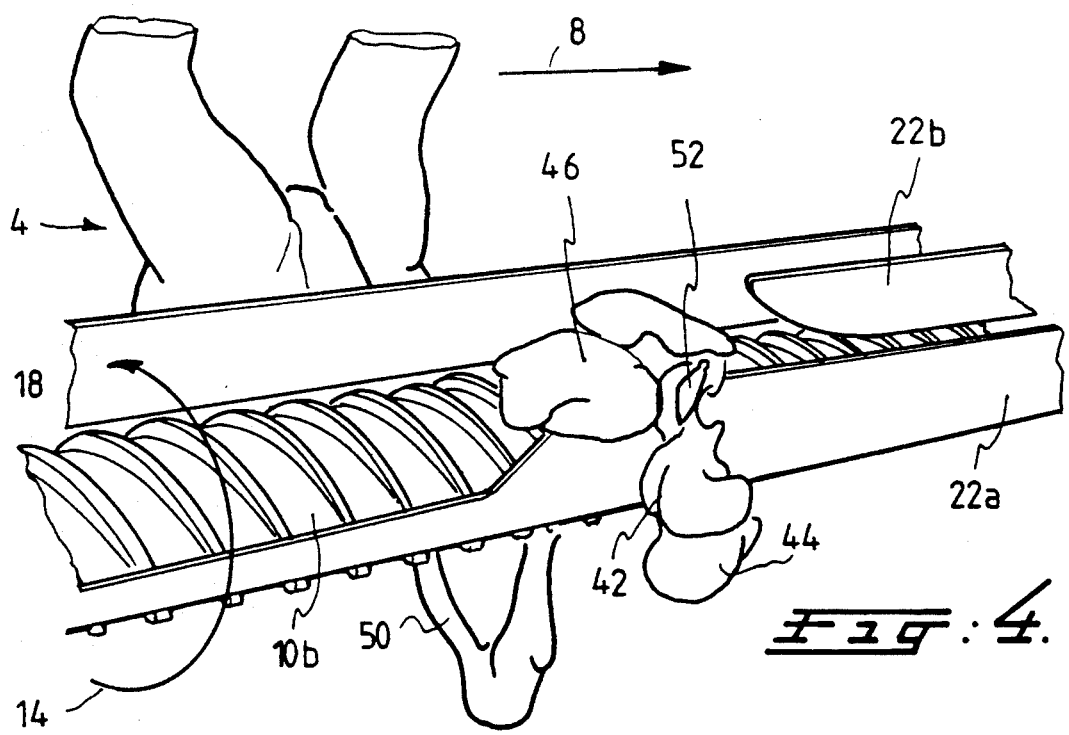
Figure 5:
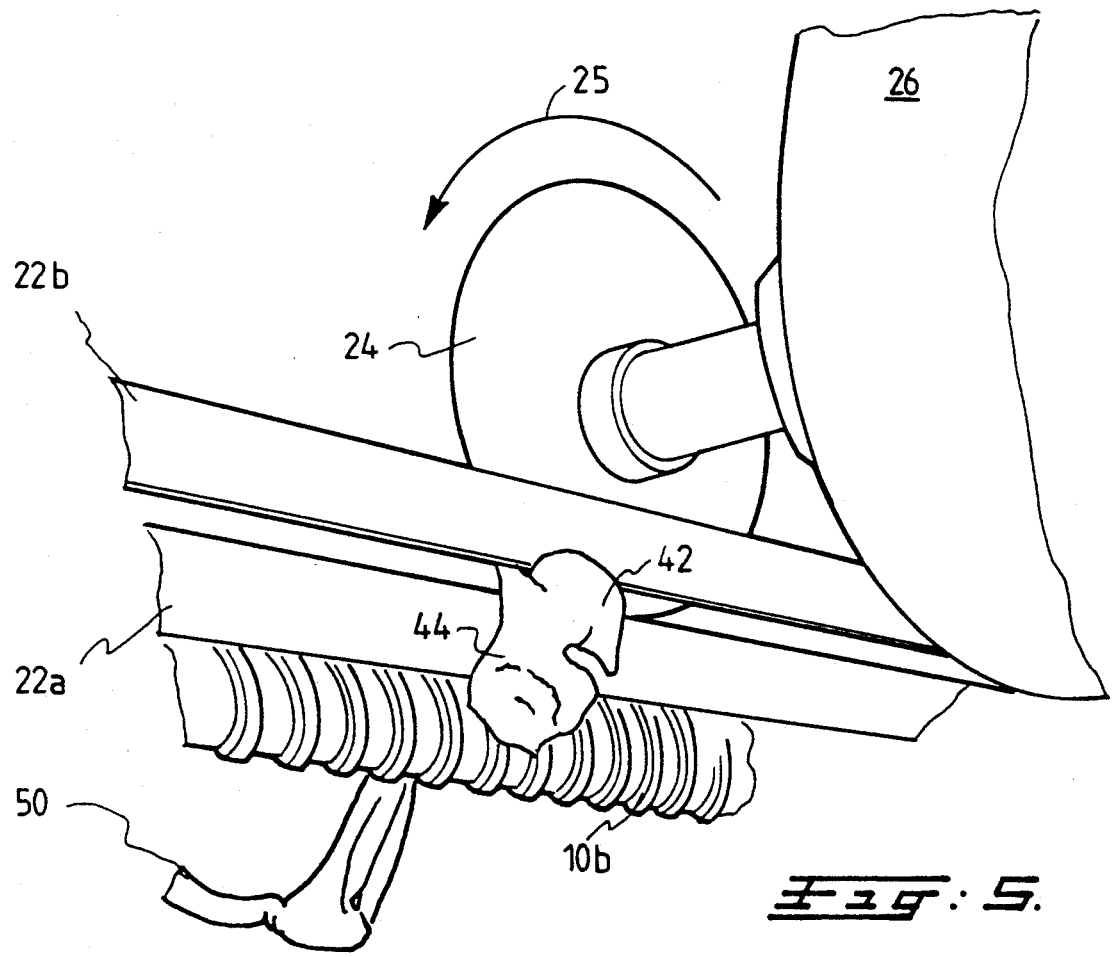

FIG. 4 shows a subsequent position of organs 42-48 as a result of the rotation of helical roller 10b in the direction of the arrow 14. The liver 46 cannot pass the gap between the helical roller 10b and the liver guide 18 and consequently remains moving along the liver guide in the direction of arrow 8 during this movement. The connecting tissue 52 between the liver 46, on the one hand, and the heart 42 and the lungs 44, on the other, is thus guided between the facing edges of the bottom heart/lung guide 22a and the top heart/lung guide 22b. The gap between the elements 22a and 22b is at such a distance from the liver guide 18 and is so narrow that the liver ends up moving at the helical roller side of the elements 22a and 22b, and the heart 42 and the lungs 44 end up moving at the side of the elements 22a and 22b facing away from the helical roller 10b. A pulling force is also still exerted on the liver by the helical roller 10b in the direction of the arrow 14, so that a pulling force is exerted on the connecting tissue 52 between the liver 46, on the one hand, and the heart 42 and the lungs 44, on the other, at the side of the elements 22a and 22b facing the helical roller 10b. On further conveyance of the organs 42-48 in the direction of the arrow 8 the connecting tissue 52 passes the path of the cutter 24 rotating in the direction 25, so that the connection between the liver 46, on the one hand, and the heart 42 and the lungs 44, on the other, is broken. This operation is illustrated in FIG. 5.

FIG. 6 shows the stage of the operation in which the heart 42 and the lungs 44 are cut off from the viscera, following which they have fallen into the funnel 32 and are discharged to the heart/lung separator 34. The rotation of the helical roller 10b in the direction of the arrow 14 causes the gall-bladder 48 to be conveyed through the gap between the liver guide 18 and the helical roller 10b, as a result of which the distance between the liver 46 and the gall-bladder 48 is increased and the connecting tissue between the liver and the gall-bladder lies mainly in the region of the gap between the liver guide 18 and the helical roller 10b. The viscera guide 20 ensures that the viscera 50 are held in contact with the helical roller 10b over a certain part of the periphery of the helical roller, so that the force in the direction of the arrow 14 through the rotation of the helical roller is certainly sufficient for pulling the liver towards the liver guide 18 and positioning of the gall bladder. The cutter 28 rotating in the direction 29 is disposed in line with the liver guide 18 and during the conveyance of the liver 46 and the gall-bladder 48 by the helical roller 10b consequently cuts only into the tissue connecting the two organs 46 and 48. This operation is shown in FIG. 7. After the severance of the connecting tissue between the liver 46 and the gall-bladder 48 the liver falls through the funnel 38 into the liver collection bin 40. The connecting viscera 50 with the intact gall-bladder 48 slide off the helical roller 10b after separation of the liver 46 and, hanging from the bird 4, pursue the path which is determined by the conveyor 2.

Although in the drawing a liver guide in the form of a strip is shown, it is also possible to design a liver guide in the form of a rotary roller driven by a motor parallel to the viscera conveyor element 10, in which case the direction of rotation of the roller is opposite to the direction of rotation 14 of the viscera conveyor element.

Figure 8:
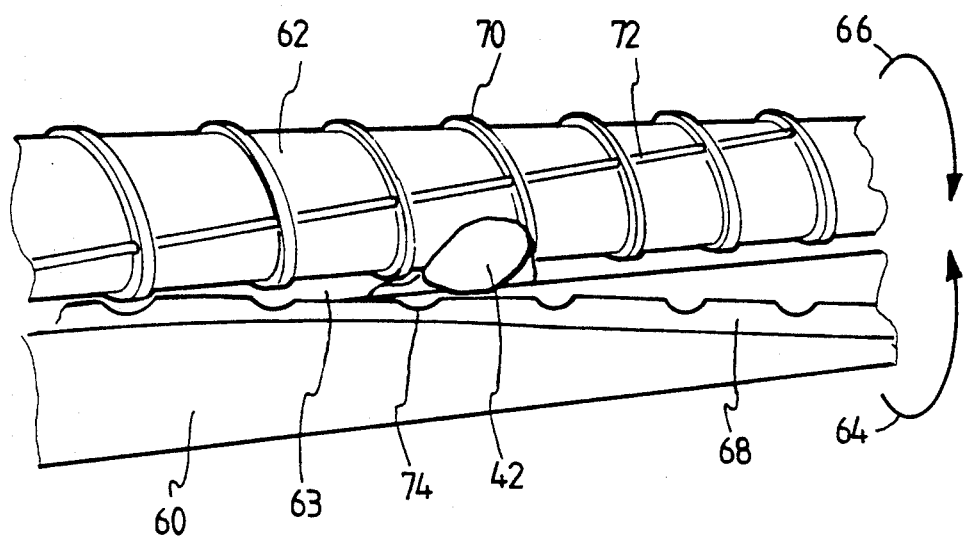
FIG. 8 shows a top view in perspective of a part of a heart/lung separator of the device according to the invention.

FIG. 8 shows a part of two rollers 60 and 62 of essentially equal length and diameter. The rollers 60 and 62 are disposed parallel to each other, leaving a narrow gap 63 and rotating in operation at the same speed in opposite directions 64 and 66, respectively. The roller 60 is provided with a first helical carrier rib 68 with a pitch of the order of magnitude of the length of the roller. The roller 62 is provided with a helical rib 70 with a pitch which is a number of times smaller than the length of the roller. The roller 62 is also provided with a second helical carrier rib 72, the pitch of which is of the order of magnitude of the length of the roller, all this in such a way that the carrier rib 68 can cooperate with the carrier rib 72. For that reason it is necessary to provide the carrier rib 68 at regular intervals with recesses 74, which intervals are determined by the pitch of the helical rib 70 and are designed to allow it to pass.

At the beginning of the heart/lung separation by means of the heart/lung separator 34 of which the rollers 60 and 62 form part, the connected lungs 44 and heart 42 fall into the nip of the rollers. The interacting rollers 60 and 62 convey the lungs through the gap 63; the heart 42 cannot, however, pass through the gap 63. The tissue connecting the heart 42 and the lungs 44 is thus positioned in the gap 63 and severed by the interacting carrier ribs 68 and 72. The heart 42 is conveyed by the helical rib 70 to one end of the rollers 60 and 62 for further processing, while the lungs 44 can be collected below the rollers 60 and 62 for further processing.

While the invention has been described and illustrated in its preferred embodiment, it should be understood that departures may be made therefrom within the scope of the invention, which is not limited to the details disclosed herein.

What is claimed is:

1. A device for separating the heart, the lungs and the liver from the viscera of a slaughtered bird, comprising:
    a conveyor for moving the bird along a predetermined path;
    viscera conveyance means for moving a part of the viscera comprising the heart, the lungs, the liver and the gall-bladder connected to the bird along essentially parallel to the path of the bird;
    heart/lung guiding means for positioning the connection between the liver, on the one hand, and the heart and the lungs, on the other, relative to heart/lung separating means for breaking the connection between the liver, on the one hand, and the heart and the lungs, on the other; and
    liver guiding means for positioning the liver relative to liver separating means for breaking the connection between the liver and remainder of the viscera, while the viscera conveyance means can cooperate with the liver guiding means for positioning the liver and the gall-bladder in such a way relative to the liver separating means that the distance between the liver and the gall-bladder is increased and the liver separating means act solely on the tissue connecting the liver and the gall-bladder,
    wherein the viscera conveyance means in the region of the heart/lung guiding means and the liver guiding means comprise a helical roller with such pitch and direction of rotation that viscera lying over it exert a force on the heart and the lungs, and the liver, respectively, for the advance thereof past the heart/lung guiding means and the liver guiding means respectively.

2. A device according to claim 1, wherein the liver guiding means comprise a surface disposed above and parallel to the helical roller, while between the helical roller and the bottom side of the surface a gap of such height is formed that the liver cannot pass through said gap and the gall-bladder can pass through said gap under the action of the helical roller.

3. A device according to claim 2, wherein the liver guiding means comprise a guide roller driven so that it rotates in the opposite direction to the helical roller, which guide roller extends parallel to the helical roller.

4. A device according to claim 1, comprising viscera guiding means for holding the viscera lying over the helical roller in contact with a predetermined part of the periphery of the helical roller.

5. A device according to claim 1, comprising a heart/lung separator containing a pair of rollers disposed parallel to each other and rotatable in opposite directions to each other at the same speed, the first roller being provided with a first carrier rib, and the second roller being provided with a helical rib with a pitch which is a number of times smaller than the roller length, and with a second carrier rib, which first and second carrier ribs can interact with each other for the separation of the lungs from the heart.

6. A device according to claim 5, wherein the first carrier rib and the second carrier rib run helically with a pitch of the order of magnitude of the roller length.

* * * * *